(12) United States Patent
Jacobsen

(10) Patent No.: US 6,288,178 B1
(45) Date of Patent: Sep. 11, 2001

(54) PROCESS FOR REDUCING TRANSIENT OPERATION TIME IN POLYMERIZATION REACTORS

(75) Inventor: Lance L. Jacobsen, Lake Zurich, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 09/455,182

(22) Filed: Dec. 6, 1999

(51) Int. Cl.$^7$ .................................................. C08F 2/34
(52) U.S. Cl. ................................. 526/67; 526/68; 526/77
(58) Field of Search ........................ 526/68, 77, 67

(56) References Cited

U.S. PATENT DOCUMENTS

| 4,200,714 | * | 4/1980 | Mahoney et al. | ......... | 526/68 |
| 4,650,814 | * | 3/1987 | Keller | ......... | 518/703 |
| 5,627,242 | | 5/1997 | Jacobsen et al. | ......... | 526/60 |

FOREIGN PATENT DOCUMENTS 4241530   6/1994   (DE) .

OTHER PUBLICATIONS

McAuley et al., "Optimal Grade Transitions in a Gas Phase Polyethylene Reactor", AIChE Journal, Oct. 1992, vol. 38, No. 10, pp. 1564–1576.

Debling et al.,"Dynamic Modeling of Product Grade Transitions for Olefin Polymerization Processes", AIChE Journal, Mar. 1994, vol. 40, No. 3, pp. 506–520.

* cited by examiner

Primary Examiner—Peter D. Mulcahy
Assistant Examiner—William K Cheung
(74) Attorney, Agent, or Firm—John G. Tolomei; Frank S. Molinaro; Richard P. Silverman

(57) ABSTRACT

In the operation of a gas phase polymerization reactor, a significant amount of production time and material can be lost during the transition from initial process conditions for the production of one product to the desired process conditions for the production of a second product. The present invention recognizes the synergy between the use of a membrane separation zone selective for the removal of hydrogen from the reactor effluent and the operation of the polymerization reactor during the transition period to significantly reduce the transition time and substantially reduce the production of off-specification product during the transition period.

9 Claims, 1 Drawing Sheet

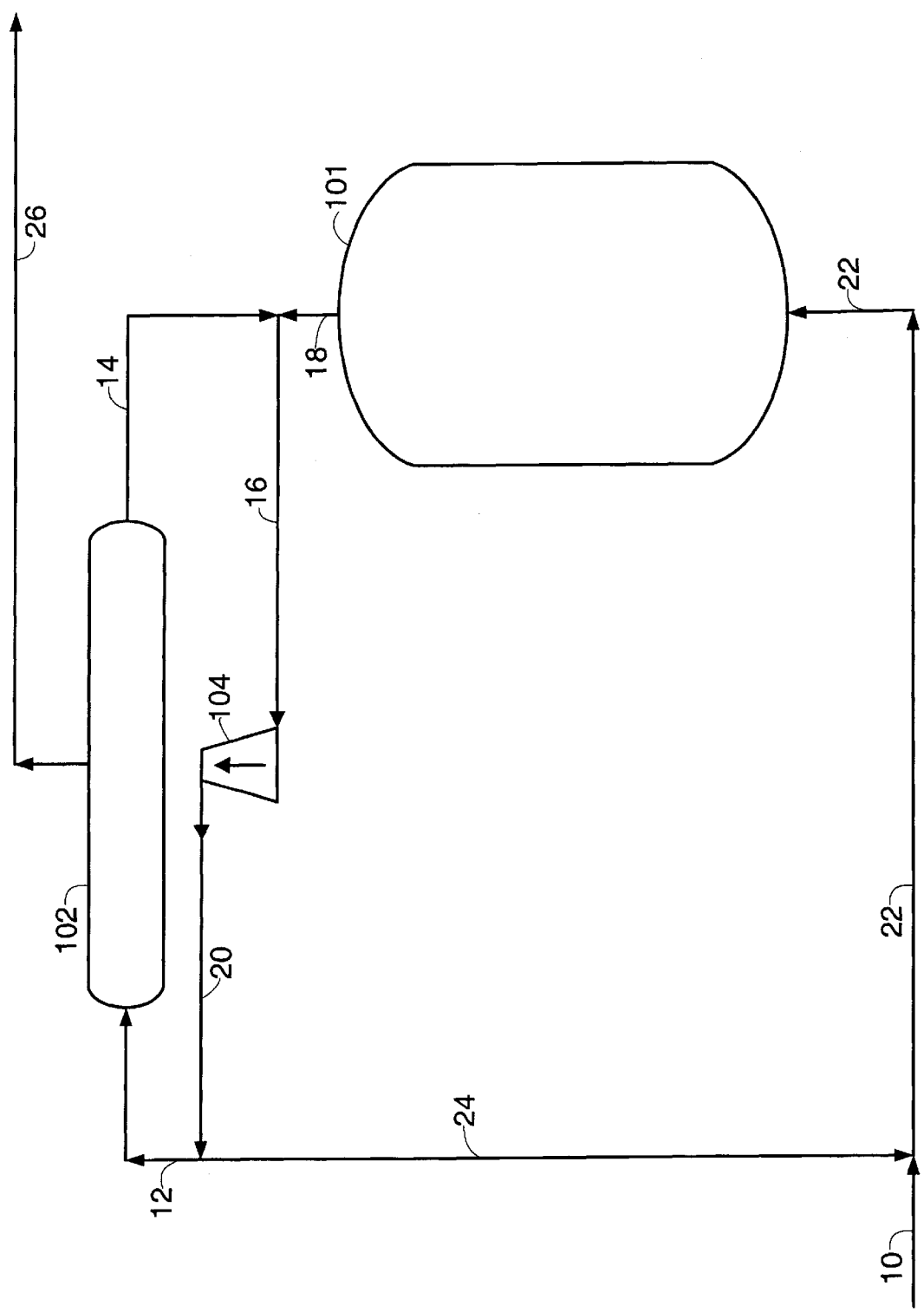

PROCESS FOR REDUCING TRANSIENT OPERATION TIME IN POLYMERIZATION REACTORS

FIELD OF THE INVENTION

The invention relates to a process for improving the operation of a gas phase fluidized bed reactor to reduce the time and volume of transient operation when switching from one type of product to another or in controlling fluctuations in steady-state manufacture. More particularly, the present invention relates to the use of a membrane separation zone in conjunction with a polymerization reactor to control the hydrogen content of the recycle.

BACKGROUND OF THE INVENTION

The fluidized bed technology in olefin polymerization reactors used today can be adjusted to produce a wide variety of products. This is particularly true for polyethylene manufacture. Generally, one reactor system must produce resins that can be used in a variety of applications including injection molding, blow molding, roto-molding, wire coating, piping and tubing manufacture, and film manufacture. Basic fluidized bed reactor technology is employed to make a wide variety of polyolefin products, e.g., homopolymers and copolymers of polyethylene, polypropylene, $C_4$–$C_{12}$ alpha olefins; ethylene-propylene-diene monomer (EPDM), polybutadiene, polyisoprene, and other rubbers. In general, polymer products are made using the same reactants in the same reactor, but reactor conditions such as reactant ratios and operating temperatures determine final properties of the polymer products. In addition, polymer products are produced with a number of different resin properties, or grades, wherein each grade of polymer product has a narrow range of properties, e.g., density and melt index.

The length of time a reactor is used to make a particular type of polymer product depends on the market demand for the product. Demand for some products are so high that a reactor can continue producing the same product for weeks without change. Other products, because of their lower market demand or availability of reactant, are made for much shorter periods of time. Unfortunately, industrial reactors require transient time to adjust to the new conditions (e.g., temperature, reactant pressures, and reactant ratios). Material produced during this transient or interim time is constantly changing but generally does not fall within the properties (e.g., melt index and density) of either the old product or the new product to which the reactor is being adjusted to during the transition. Changing the mode or operation of a reactor from one product to another product is not made instantaneously and requires a quantifiable and significant period of transiency time, or transient time, to become adjusted to the desired conditions for producing the new product. Similarly, fluidized reactors operating at desired or fixed conditions, i.e., at "steady state", can experience fluctuations that can result in the production of "offgrade" material. This production of offgrade material represents an economic loss and is desirably minimized.

Generally, industrial control systems for gas phase, fluidized bed polymerization reactors are designed to permit the operators to control the reactor by allowing the operators to select a desired target property such as a melt point index and a product density. Correlations of these properties relating the property to reactor processing variables are usually well known by the operators and those in the art for the particular reactor design and catalyst being used. The prior art has devised a number of methods to reduce the transient, offgrade material. These methods typically involve some combination of adjusting the automatic flow/ratio controllers to a new value either at or above the ultimately desired value ("dial-in transition" and "overshoot"), removing the reactant gas entirely ("inventory blow down"), reducing the level of the catalyst ("low bed"), and adding a nonreactive gas ("nitrogen addition").

DE-4241530 describes using a kill gas to stop a polymerization reaction, blowing the gas inventory for that reaction out of the reactor, and rebuilding a new gas inventory for a new product. This method reduces transition material. The costs associated with throwing away the old gas inventory and rebuilding a new inventory are too high for commercial transitions between closely related grades. Thus, most transitions between grades of the same material are performed by adjusting the reaction conditions.

McAuley et al. ("Optimal Grade Transitions in a Gas Phase Polyethylene Reactor", AIChE Journal, October 1992, Vol. 38, No. 10, pp. 1564–1576) discloses three manual, labor-intensive transition strategies for gas phase polyethylene reactors. The first is an adjustment to the controls to overshoot the melt index and density values. The hydrogen feed and co-monomer feeds are increased to meet the designated properties. The actual desired setpoint values are directed when the sensors indicate that the desired product is being produced. The second is an increase in temperature and manipulation of the slow vent to move the melt index of the produced product. The third is a drop in the catalyst level of the lower bed while keeping the bed resin residence time at a constant to reduce offgrade production.

Debling, et al., ("Dynamic Modeling of Product Grade Transitions for Olefin Polymerization Processes", AICHE Journal, March 1994, Vol. 40, No. 3, pp. 506–520) compares transition performance of different types of polyethylene reactors. The article discloses seven separate manual, labor-intensive transition strategies: (1) dialing in the final aim transition; (2) gas inventory blow down and simple dial-in transition; (3) low bed and simple dial-in transition; (4) gas inventory blow down and overshoot of melt index and density transition; (5) low bed, gas inventory blow down, land overshoot transition; (6) low bed and overshoot transition; and (7) gas inventory blow down, overshoot, and nitrogen addition transition.

U.S. Pat. No. 5,627,242 discloses a method for controlling a gas phase polymerization reaction in a reactor when changing from a first product made at a first set of conditions to a second product made at a second set of conditions using a correlated melt index to adjust the property of the reaction product. New reactor control setpoints are established to adjust the approach toward the second set of conditions by offsetting the reactor temperature and reactant partial pressure according to the magnitude and direction of the difference between the first and second product melt indices.

Permeable membrane processes and systems are known in the art and have been employed or considered for a wide variety of gas and liquid separations. In such operations, a feed stream is brought into contact with the surface of a membrane, and the more readily permeable component of the feed stream is recovered as a permeate stream, with the less readily permeable component being withdrawn from the membrane system as a non-permeate stream. Membrane separation modules are maintained at operating conditions which result in a non-permeate side pressure at which the feed gas is introduced and the non-permeate stream is withdrawn, and a permeate side pressure at which the permeate stream is withdrawn. The pressure on the non-permeate side of the membrane is higher than the pressure on the permeate side, and the pressure differential between the non-permeate and the permeate sides of the membrane generally determines the degree of separation attained by the membrane separation.

Despite this wide variety of available schemes, there is a continuing need and desire to reduce the amount of offgrade material produced during transition to a new product grade or during steady-state manufacture.

It is an object of the invention to provide a method for reducing the amount of off-grade material produced during grade transition or during steady-state manufacture.

It is another object of the invention to provide a method for reducing the transition time and volume of transient material when switching from one polymer product to another product of similar chemistry but different properties.

SUMMARY OF THE INVENTION

By the present process, the transient time and amount of offgrade material produced during that transient period is reduced through control of the hydrogen content of the circulating reactant gas by directly removing hydrogen from the circulating gas with a membrane separation zone. The process of the present invention reduces losses of valuable unreacted olefin monomer. The present invention can be used in systems which produce a vent gas or in systems which do not produce a vent or waste gas stream. The elimination of a vent gas stream comprising olefin monomer reduces the loss of these valuable materials. The control process of the invention is well suited for automated control over the polymerization reaction system in the transition period between production modes or during normally steady-state conditions where the objective is continuous production of a single grade of polymer. Such steady-state operations can be improved by the minimization of process transients or fluctuations by the direct control of the hydrogen partial pressure of the reactants. In addition, the improved reactor stability provided by the present invention avoids the overheating of the exothermic polymerization reactor during transition periods when all of the reactor gases are vented and the effectiveness of the reactor heat exchangers in controlling the temperature of the reaction is decreased.

In accordance with these and other objects of the invention that will become apparent herein, the invention is a process for recovering hydrogen from a gas phase polymerization reaction zone. The process comprises withdrawing a reactor effluent stream comprising hydrogen from the gas phase polymerization reaction zone and passing at least a portion of the reactor effluent stream at effective membrane separation conditions to a membrane separation zone for the selective permeation of hydrogen to provide a hydrogen stream and a non-permeate stream depleted in hydrogen relative to the reactor effluent stream. The non-permeate stream is returned to the gas phase polymerization reaction zone to effect the reduction in hydrogen partial pressure in the gas phase polymerization reaction zone.

In another embodiment, the invention is a process for controlling hydrogen partial pressure to a desired hydrogen partial pressure in a gas phase polymerization reaction zone. The process comprises a series of steps. A reactor zone hydrogen partial pressure is measured in the gas phase polymerization reaction zone. A reactor effluent stream is withdrawn from the gas phase polymerization reaction zone and passed to a compression zone to provide a compressed reactor effluent stream. At least a portion of the compressed reactor effluent stream is returned to the gas phase polymerization reaction zone. The reaction zone hydrogen partial pressure is compared to the desired hydrogen partial pressure and, if said reactor zone hydrogen partial pressure is greater than the desired partial pressure, at least a portion of the compressed reactor effluent stream is passed to a membrane separation zone. The membrane separation zone is selective for the permeation of hydrogen to provide a permeate stream enriched in hydrogen and a non-permeate stream depleted in hydrogen relative to the reactor zone hydrogen partial pressure. At least a portion of the non-permeate stream is admixed with the reactor effluent stream prior to passing the reactor effluent to the compression zone. The passing of the portion of the compressed reactor effluent to the membrane separation zone is continued until the reaction zone hydrogen partial pressure is essentially equal to the desired pressure.

BRIEF DESCRIPTION OF THE DRAWING

The drawing is a simplified process flowchart illustrating the process of the present invention.

DETAILED DESCRIPTION

The present invention is directed to a method for reducing the volume of offgrade, or off-specification, material in an olefin polymerization reactor employing a rate-limiting olefin gas. The hydrogen partial pressure is controlled according to the partial pressure of the rate-limiting olefin gas to maintain the melt index of the product. Specifically, the volume of offgrade material produced when switching from a first product grade to a second product grade or from fluctuations within a designated product "grade" during steady-state manufacture are reduced by directly adjusting the hydrogen partial pressure in the rate-limiting reaction. This is accomplished by the use of a membrane separation zone to selectively remove a desired amount of hydrogen during the transition period. The combination of the membrane separation zone with the reactant gas recirculation system accelerates the speed with which the gas phase polymerization reaction zone moves toward the production of the desired product. The volume of offgrade material produced is, of course, directly related to the time it takes for the gas phase polymerization reaction zone to change from a first hydrogen partial pressure, along with other conditions (such as temperature, monomer ratios, etc.) to a second set of desired conditions. The partial pressure of the rate-limiting reactant is one indicia.

According to the present invention, the hydrogen concentration in the gaseous reactor inventory is used to reduce transition time. Because hydrogen terminates the polymerization reaction, even small quantities of hydrogen in the reactor can have a pronounced impact on the grade of the average product melt index. The hydrogen concentration can be adjusted by bleeding off a relatively small quantity, e.g., 1–8 wt-% preferably about 3–6 wt-%, of gas inventory or passing a proportion of the total gas inventory over hydrogenation catalyst in a satellite system with a fixed or fluidized bed. Hydrogenation will convert some quantity of the olefin to nonreactive alkane which would constitute a diluent.

Any membrane may be used in the process of the present invention so long as it is substantially permeable to hydrogen and substantially impermeable to hydrocarbons such as ethylene. Additionally, the membrane should have good compatibility with the gases to be separated, strong structural strength to endure high transmembrane pressure differentials, an adequate flux for given separation parameters, and the like. Such membranes may be made of polymeric materials such as cellulosic derivatives, polysulfones, polyamides, polyaramides, and polyimides. Such membranes may also be made of ceramic, glass, and metal. Preferred membranes for use in the present invention include those described in EP-219878 and U.S. Pat. No. 5,085,774, the contents of which are hereby incorporated by reference.

The membrane employed in the present invention may be contained in one or more membrane stages, which may be in the form a membrane separator. A membrane separator may contain a series of alternating layers of membranes and spacers which are wrapped around a collection pipe in a "spiral wound" fashion. Gas enters the separator, and the permeate will pass through the wrapped membranes and into the collection pipe. The permeate passes through the collection pipe and exits the separator through an outlet. Non-permeating gases, i.e., retentate or residue, exit the separator through another outlet.

In another alternative, the membrane may be in the form of hollow fibers. In such a separator, gas which enters the separator contacts the fiber membrane. The permeate enters the hollow fibers while the non-permeating gases, i.e., retentate or residue, remain outside the fibers. The permeate travels at reduced pressure inside the fibers to a manifold which conducts the permeate to a permeate outlet. The retentate, or non-permeate stream, travels to a separator outlet at essentially the same pressure as the entering feed gas.

Examples of the above-mentioned membrane separators are further described in Spillman, "Economics of Gas Separation Membranes," *Chemical Engineering Progress*, January 1989, pp. 41–62, and Haggin, "New Generation of Membranes Developed for Industrial Separations," *Chemical and Engineering News*, Jun. 6, 1988, pp. 7–16. Membranes suitable for the present invention include composite membranes such as those membranes disclosed in U.S. Pat. No. 4,822,382, which is hereby incorporated by reference.

The present invention can be performed on a variety of reactor equipment suitable for performing catalytic, gas phase, fluidized bed polymerization. One or more reactors can be used in sequence or in parallel. Usually, such reactors will be designed for commercial operation and will have suitable controls allowing adjustable setpoint values for melt index, product, reaction temperature, reactant ratios, filed ratios, reactant partial pressures, and catalyst levels in the reactor. The most preferred reactor is sold under the trademark UNIPOL.RTM. and is available from Union Carbide Corporation, Danbury, Connecticut. See also, U.S. Pat. No. 4,302,565 and U.S. Pat. No. 4,482,687, the disclosures of which are herein incorporated by reference.

Any polymerization catalyst that can be used in the reactor can be controlled with the process control sequence of the present invention. Suitable catalysts include those of transition metals, Ziegler-Natta, metallocene, and rare earth components. The catalyst can be soluble, insoluble, supported, or unsupported.

Polymers which can be produced using the method of the present invention are generally olefin polymers. Exemplary products include ethylene homopolymers, propylene homopolymers, copolymers of ethylene and at least one $C_3$–$C_{12}$ alpha olefin, terpolymers of ethylene, and at least one $C_3$–$C_{12}$ alpha olefin and a diene. Examples of specific product polymers that can be made include ethylene-propylene copolymer, ethylene-butene copolymer, ethylene-hexane copolymer, and ethylenepropylene-diene rubbers, copolymers of propylene and at least one $C_4$-$C_{12}$ alpha olefin (such as propylene-butene copolymer and propylene-hexane copolymer), polybutadiene, and polyisoprene.

The reaction conditions and catalysts used in the controlled process are those conventionally used to make the designated products. In general, the olefin gas inventory in the reactor will be completely replaced up to about 5 times per hour (<5 GHSV), preferably about 0.5–3 GHSV. The catalyst inventory in the fluidized bed turns over every 2–4 hours (0.25–0.5 CSV). Preferably, the polymerization reaction conditions include a reactor pressure ranging from about 14 bar (200 psia) to about 30 bar (450 psia), wherein the differential pressure between the initial hydrogen partial pressure and the desired hydrogen partial pressure is at least greater than about 0.3 bar (5 psia), and more preferably, the differential pressure between the initial partial pressure and the desired hydrogen partial pressure ranges between about 0.3 bar (5 psia) and about 7 bar (100 psia).

Transition generally starts from an initial operating condition in which a first product exhibiting a first product melt index value (or any other expression of a change in molecular weight, e.g., flow index, flow ratios, and related standard methods) is made at a first product reaction temperature setpoint and a first rate-limiting reactant concentration setpoint. The desired second product will have different melt index and reactant feed ratio values that are either higher or lower. Changes in the temperature and rate-limiting reactant partial pressure values, particularly the hydrogen partial pressure of the reactants, are used to reduce the time required for the catalyst bed to begin producing the new product. Importantly, transition can occur between steady-state operating conditions or within a subset of conditions within acceptable upper and lower limits of a given steady-state manufacturing process.

Certain setpoint changes are applicable to initiating and controlling the transition from one product to another. Depending on the specific system and the extent of available computer control over the process, operators will be able to change the setpoints for melt index, reaction temperature, hydrogen feed rate, rate-limiting reactant feed rate and/or partial pressure, co-monomer feed rate and/or partial pressure, and catalyst level in the reactor.

Generally, a change in desired melt index depends on the rate at which hydrogen is introduced to the system and is proportional to the change in reaction temperature setpoint. Conversely, a rate-limiting reactant partial pressure and rate of hydrogen removal are inversely proportional to the change in melt index. Stated another way, an increase in melt index value is accompanied by an increase in temperature but a decrease in rate-limiting reactant partial pressure and hydrogen removal rate.

For the control process of the invention, the temperature setpoint can be changed in advance of or simultaneously with a change in ethylene partial pressure and hydrogen feed rate setpoints to cause a change in the average melt index of the reaction product within the catalyst bed. A change in the melt index setpoint, regardless of whether it is set directly or calculated, should be about 0–150% higher than the target setpoint for the new product if the second product's melt index is higher than the first product's melt indix or 0–70% lower if the second product's melt index is lower than the first product's melt index. The change in melt index will be accompanied by a change in the hydrogen concentration. Average melt index can be determined with measurements on samples withdrawn and tested or by in-line, automated samplers. Actual sampling can be performed every 2–4 hours. In-line samplers will perform such tests 3–4 times per hour.

Control over the temperature and rate-limiting reactant setpoints can then be used to accelerate rate of transition to the new product without exceeding the desired equilibrium reaction conditions within the catalyst bed. After the new melt index setpoint is set, the temperature setpoint is changed to a value within the range of about 1°–15° C. from the target setpoint for the steady-state manufacture of the new product (above the old setpoint if the melt index is increasing, or below the old setpoint if the melt index is decreasing) and changing the ethylene partial pressure setpoint to a value within the range from about 1–25 psig of the target setpoint (below the old setpoint if the melt index is increasing, or above the old setpoint if the melt index is decreasing). The actual implementation of such changes will depend on the existing hardware but changes can occur by discrete step increments or in a smoothly varying change.

It should be remembered that the gaseous inventory in a polymerization reaction zone can be changed to the new target composition much more quickly than the catalyst bed can begin to produce the new product. For example, the gas composition can be adjusted in about 15 minutes, but the gas phase polymerization reaction zone will not generally be producing the new product for 2–6 hours even when controlled by the process of the invention. This inertia by the bed is quantifiable through appropriate, known mass transfer differential equations which are used to generate computerized models of the reaction system. Thus, the changes in temperature and rate-limiting reactant partial pressure act as forces on the reaction system to cause change.

When the product melt index, as reflected by sampling, is at a point where the bed inertia suggests a change or is within acceptable upper and lower limits of the desired product, the setpoints are changed back to the steady-state target setpoints for the new product so the reactor can begin to achieve steady-state operation with a consistent product grade of polymer. The art refers to this reduction in rate of changes as the "return" phase of a transition, i.e., a return to steady state.

During the return phase, the temperature and rate-limiting reactant partial pressure are adjusted toward the steady-state target values to reduce the force of change on the bed and approach steady state. The setpoint reaction temperature is readjusted to a value that is 0°–15° C. either below the target value if the melt index is rising to the new target value or above the target value if the melt index is decreasing toward the new target value. Similarly, the ethylene partial pressure is adjusted by 0–25 psig below the target value if the melt index is rising to the new target value or by 0–25 psig above the target value if the melt index is decreasing toward the new target value. Because the rate of change in the product melt index is being slowed and approach a value within acceptable upper and lower limits about a target melt index value, the instantaneous melt index readings should be monitored often and carefully. When the reaction product melt index falls within the acceptable upper and lower limits, the temperature and ethylene partial pressure setpoints are set to the target values. The reactor is then controlled to maintain steady-state operation.

DETAILED DESCRIPTION OF THE DRAWING

The invention can also be described with reference to the enclosed drawing depicting the process of the present invention as exemplified by a process for the production of polypropylene, although the invention may be applied to any olefin polymerization reactor which employs a rate-limiting olefin gas such as ethylene or polypropylene. Referring to drawing, a feed stream comprising propylene is introduced via line 10 and combined with a recycle stream in line 24 to produce a feed admixture in line 22. The feed admixture in line 22 is passed to a polymerization reactor 101. In the polymerization reactor, the propylene in the presence of a polymerization catalyst reacts to form polypropylene. The polymerization reactor 101 is a fluidized bed reactor from which is withdrawn a vapor stream in line 18. The vapor stream comprises hydrogen, propylene, and heavier hydrocarbons. The vapor stream is passed to a compressor 104 via lines 18 and 16. A compressed vapor stream is withdrawn from compressor 104 in line 20. A portion of the vapor stream is returned to the polymerization reactor 101 as the recycle stream via lines 24 and 22. According to the present invention, at least a portion of the compressed vapor stream in line 20 is passed via line 12 to a membrane separation zone 102. The membrane separation zone is operated at effective membrane separation conditions. Preferably the effective membrane separation conditions include a membrane zone pressure of between about 14 bar (200 psia) and about 33 bar (500 psia). In the membrane separation zone 102, hydrogen selectively permeates through the membrane and is removed in line 26 as a hydrogen vent stream. The remaining hydrocarbons, including propylene and heavier hydrocarbons, are returned via line 14 and admixed with the vapor stream in line 18 prior to being passed to compressor 104. In this manner, during a transient operation, hydrogen which is known to inhibit the polymerization reaction can be effectively removed without the loss of valuable propylene reactant, thus significantly reducing the transient time between operations of the polymerization reactor 101 and resulting in significant reductions in operating cost and operating flexibility over the prior art.

The present invention can be explained with reference to the following examples.

EXAMPLES

A series of engineering simulation is presented to show the advantages of the present invention over the prior art of polymerizing polyethylene. For comparison purposes, the analysis is based on a commercial size gas phase polyethylene using a fluidized polyethylene reactor with a reactor volume of about 270 cubic meters (9500 cubic feet) producing about 200,000 MTA, metric tonnes per annum, (about 50,000 pounds per hour). The typical reactor operating conditions include a process temperature of about 100° C., a total pressure of about 2,100 kPa (300 psia), and an ethylene partial pressure of about 700 kPa (100 psia). The following examples include an allowance for the average residence time, or inertia, of the polymerization reaction zone of about 3 hours for the reaction zone to reach the new desired operating level.

Example I

In a given transition period related to the operation of the gas phase polymerization reaction described hereinabove, it is desired to reduce the hydrogen partial pressure from an initial value of about 700 kPa (100 psia) to about 70 kPa (10 psia) to be consistent with the production of a second product, while continuously removing a waste stream comprising about 0.5 mol-% ethylene. Based on the current practice of allowing the polymerization reaction to continue without venting the reactor and without the addition of make-up hydrogen to the reactor, the transition time is approximately 34 hours. During this 34-hour transition time, about 1.7 million pounds of off-specification material is produced corresponding to a loss of ethylene of about 8500 pounds.

Example II

The transition boundary conditions of Example I are contrasted with another example of the conventional technology whereby the reactor is partially vented and the flow of make-up hydrogen is discontinued. Accordingly, establishing a reactor vent flow of about 370 pounds per hour results in a transition period of about 19.1 hours and corresponds to the production of about 1 million pounds of off-specification product and an equivalent ethylene loss of about 8400 pounds.

Example III

The process of the present invention is employed for the removal of about 100 pounds per hour of hydrogen, wherein a hydrogen permeate stream comprising essentially pure hydrogen (about 100 mol-% hydrogen content) is produced. The transition period for reducing the hydrogen partial pressure from about 700 kPa to about 70 kPa is about 7 hours and reduces the transition off-specification product to about 0.35 million pounds, corresponding to a loss of ethylene of about 1700 pounds. This represents about a two-thirds reduction in ethylene loss over conventionally venting the reactor in Example II and about a 5-fold reduction over conventionally reducing the make-up hydrogen as shown in Example I. Similar advantages would result for the production of polypropylene in a polymerization reaction zone wherein propylene is the rate-limiting olefin gas.

Example IV

The process of the present invention is employed with the removal of about 50 pounds per hour of hydrogen, as a hydrogen permeate stream at a hydrogen purity of about 50 mol-%. The transition time for this Example IV is about 15.7 hours. As in Example III, the process of the present invention shows a significant reduction in the production of off-specification product to 0.78 million pounds, and a correspondingly reduced in loss of the equivalent amount of ethylene of about 3900 pounds.

What is claimed is:

1. A process for recovering hydrogen from a gas phase polymerization reaction zone comprising withdrawing a reactor effluent stream comprising hydrogen from said polymerization reaction zone and passing at least a portion of the reactor effluent stream at effective membrane separation conditions to a membrane separation zone for the selective permeation of hydrogen to provide a hydrogen stream and a non-permeate stream depleted in hydrogen relative to the reactor effluent stream and returning the non-permeate stream to said polymerization reaction zone.

2. The process of claim 1 wherein recovering hydrogen occurs during a transition period to reduce an initial hydrogen partial pressure to a desired hydrogen partial pressure while maintaining a total pressure in said polymerization reactor.

3. The process of claim 2 wherein the total pressure ranges from about 20 bar (300 psia) to about 30 bar (450 psia).

4. The process of claim 2 wherein a differential pressure between the initial hydrogen partial pressure and the desired hydrogen partial pressure comprises greater than about 0.3 bar (5 psia).

5. The process of claim 2 wherein a differential pressure between the initial hydrogen partial pressure and the desired hydrogen partial pressure ranges between about 0.3 bar (5 psia) and about 7 bar (100 psia).

6. The process of claim 1 further comprising compressing at least a portion of the reactor effluent prior to passing said portion of the reactor effluent stream to the membrane separation zone.

7. The process of claim 1 wherein the effective membrane separation conditions include a membrane separation pressure comprising between about 14 bar (200 psia) to about 33 bar (500 psia).

8. A process for removing hydrogen from a gas phase polymerization reaction zone when changing from a first product produced at an initial hydrogen partial pressure to a second product produced at a desired hydrogen partial pressure lower than the initial hydrogen partial pressure, said process comprising:

a) removing a reactor effluent stream having a reactor effluent hydrogen partial pressure from said polymerization reaction zone and passing the reactor effluent stream to a compression zone to provide a compressed reactor effluent stream;

b) passing at least a portion of the compressed reactor effluent stream to a membrane separation zone selective for the permeation of hydrogen to provide a hydrogen vent stream and a non-permeate stream having a transition hydrogen partial pressure lower than the initial hydrogen partial pressure and returning a remaining portion of the reactor effluent to the gas phase polymerization reactor;

c) admixing the non-permeate stream with the reactor effluent stream prior to passing the reactor effluent to the compression zone; and d) continuing steps (a) to (c) until the reactor effluent partial pressure approaches the desired hydrogen partial pressure.

9. A process for controlling hydrogen partial pressure to a desired hydrogen partial pressure in a gas phase polymerization reaction zone, said process comprising:

a) measuring a reactor zone hydrogen partial pressure in the gas phase polymerization reaction zone wherein a reactor effluent stream is withdrawn from said reactor, passed to a compression zone to provide a compressed reactor effluent stream, and at least a portion of the compressed reactor effluent stream is returned to the gas phase polymerization reaction zone; and b) comparing the reactor zone hydrogen partial pressure to the desired hydrogen partial pressure and, if said reactor zone hydrogen partial pressure is greater than the desired partial pressure, passing at least a portion of the compressed reactor effluent stream to a membrane separation zone selective for the permeation of hydrogen to provide a permeate stream enriched in hydrogen and a non-permeate stream depleted in hydrogen relative to the reactor zone hydrogen partial pressure and admixing at least a portion of the non-permeate stream with the reactor effluent stream prior to passing the reactor effluent to the compression zone and continuing to pass at least a portion of the compressed reactor effluent to the membrane separation zone until the reactor zone hydrogen partial pressure is essentially equal to the desired pressure.

* * * * *